(12) United States Patent
Ishii et al.

(10) Patent No.: US 8,571,561 B2
(45) Date of Patent: *Oct. 29, 2013

(54) CONNECTION SWITCHING BETWEEN A PLURALITY OF ACCESS TECHNOLOGIES

(75) Inventors: Minami Ishii, Yokohama (JP); Takehiro Nakamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/326,956

(22) Filed: Dec. 15, 2011

(65) Prior Publication Data

US 2012/0083277 A1   Apr. 5, 2012

Related U.S. Application Data

(63) Continuation of application No. 12/676,813, filed as application No. PCT/JP2008/066098 on Sep. 5, 2008, now Pat. No. 8,428,600.

(30) Foreign Application Priority Data

Sep. 7, 2007  (JP) ................................. 2007-233450
Jan. 31, 2008  (JP) ................................. 2008-021872
Feb. 4, 2008  (JP) ................................. 2008-024617

(51) Int. Cl.
  *H04W 36/00*  (2009.01)
  *H04W 4/00*  (2009.01)

(52) U.S. Cl.
  USPC ........... 455/438; 455/436; 455/437; 455/439; 370/331

(58) Field of Classification Search
  USPC ........... 455/418–420, 423–425, 432.1–432.3, 455/434, 435.2, 436–440, 509, 517, 550.1, 455/552.1, 556.2, 422.1, 442–451, 455/452.1–452.2, 453, 500, 512–514, 455/524–525, 560–561; 370/310, 328–329, 370/338, 341, 331–332
  See application file for complete search history.

(56) References Cited

U.S. PATENT DOCUMENTS 5,940,759 A * 8/1999 Lopez-Torres et al. ........ 455/433
6,125,276 A * 9/2000 Lupien .......................... 455/436

(Continued)

FOREIGN PATENT DOCUMENTS

CN  1372778 A  10/2002
EP  1193989 A1  4/2002

(Continued)

OTHER PUBLICATIONS

Nokia, "CS service enabling HO for PS only network," 3GPP TSG RAN WG3 Meeting #55, R3-070194, Feb. 12-16, 2007, 9 pages.

(Continued)

*Primary Examiner* — Meless Zewdu
(74) *Attorney, Agent, or Firm* — Osha Liang LLP

(57) ABSTRACT

A mobile communication method according to the present invention includes: transmitting, from a mobile station (100) to an access node (200) in a first radio access technology, a connection request signal including a desired call type for communication and a radio access capability of the mobile station (100); determining, at the access node (200) in the first radio access technology, whether or not to perform handover to a second radio access technology on the basis of the desired call type for communication and the radio access capability of the mobile station included in the connection request signal; and transmitting, from the mobile station (100) to an access node in the second radio access technology, a connection request signal, when it is determined that the handover to the second radio access technology is to be performed.

8 Claims, 7 Drawing Sheets

(56) References Cited

U.S. PATENT DOCUMENTS

| | | | |
|---|---|---|---|
| 6,792,283 B1* | 9/2004 | Roberts et al. | 455/525 |
| 6,973,309 B1* | 12/2005 | Rygula et al. | 455/436 |
| 7,010,582 B1* | 3/2006 | Cheng et al. | 709/219 |
| 7,089,008 B1* | 8/2006 | Back et al. | 455/437 |
| 7,130,625 B2* | 10/2006 | Akgun et al. | 455/422.1 |
| 7,426,178 B2* | 9/2008 | Guo et al. | 370/210 |
| 7,590,092 B2* | 9/2009 | Milton et al. | 370/331 |
| 7,877,093 B2* | 1/2011 | Lee et al. | 455/436 |
| 7,885,232 B2* | 2/2011 | Park et al. | 370/331 |
| 8,005,478 B2* | 8/2011 | Song et al. | 455/436 |
| 8,086,235 B2* | 12/2011 | Touray et al. | 455/436 |
| 2002/0082019 A1* | 6/2002 | Sunay et al. | 455/442 |
| 2003/0114158 A1* | 6/2003 | Soderbacka et al. | 455/436 |
| 2003/0206537 A1* | 11/2003 | Choi et al. | 370/333 |
| 2003/0207688 A1* | 11/2003 | Nikkelen | 455/439 |
| 2004/0033805 A1* | 2/2004 | Verma et al. | 455/444 |
| 2004/0072563 A1* | 4/2004 | Holcman et al. | 455/432.1 |
| 2004/0203780 A1* | 10/2004 | Julka et al. | 455/436 |
| 2005/0272428 A1* | 12/2005 | Tanabe et al. | 455/439 |
| 2006/0056448 A1* | 3/2006 | Zaki et al. | 370/466 |
| 2006/0223465 A1 | 10/2006 | Akiba et al. | |
| 2006/0246902 A1* | 11/2006 | Back et al. | 455/436 |
| 2008/0220813 A1* | 9/2008 | Brown et al. | 455/552.1 |
| 2008/0311909 A1* | 12/2008 | Taaghol et al. | 455/436 |

FOREIGN PATENT DOCUMENTS

| | | | |
|---|---|---|---|
| JP | 09-116949 | A | 5/1997 |
| JP | 09-205673 | A | 8/1997 |
| JP | 2003-510920 | A | 3/2003 |
| JP | 2003-169379 | A | 6/2003 |
| JP | 2005-102268 | A | 4/2005 |
| JP | 2006-279577 | A | 10/2006 |
| JP | 2007-150915 | A | 6/2007 |
| KR | 20070037805 | A | 4/2007 |
| WO | 96/12380 | A1 | 4/1996 |
| WO | 01/22764 | A1 | 3/2001 |
| WO | 0184873 | A1 | 11/2001 |
| WO | 2005/060276 | A1 | 6/2005 |
| WO | 2006/093961 | A1 | 9/2006 |
| WO | 2006/126957 | A2 | 11/2006 |

OTHER PUBLICATIONS

3GPP TR 25.913 V7.3.0, Requirements for Evolved UTRA (E-UTRA) and Evolved UTRAN (E-UTRAN), Mar. 2006, 18 pages.
International Search Report issued in PCT/JP2008/066098, mailed on Dec. 9, 2008, with translation, 7 pages.
Written Opinion issued in PCT/JP2008/066098, mailed on Dec. 9, 2008, 3 pages.
Japanese Office Action for Application No. 09-205673, mailed on Aug. 5, 1997 (6 pages).
Patent Abstracts of Japan for Japanese Publication No. 09-205673, publication date Aug. 5, 1997 (1 page).
Office Action in Japanese Patent Application No. 2009-531300, dated Jul. 23, 2010, (6 pages).
Japanese Office Action for Application No. 2010-216242, mailed on Jan. 4, 2011 (5 pages).
Japanese Office Action for Application No. 2010-216244, mailed on Jan. 4, 2010 (8 pages).
Patent Abstracts of Japan for Japanese Publication No. 2007-150915, publication date Jun. 14, 2007 (1 page).
Patent Abstracts of Japan for Japanese Publication No. 2005-102268, publication date Apr. 14, 2005 (1 page).
Patent Abstracts of Japan for Japanese Publication No. 09-116949, publication date May 2, 1997 (1 page).
Patent Abstracts of Japan for Japanese Publication No. 2003-169379, publication date Jun. 13, 2003 (1 page).
Office Action for Japanese Patent Application No. 2010-216244 mailed Apr. 5, 2011, with English translation thereof (4 pages).
Extended European Search Report for Application No. 08829562.1 dated Sep. 16, 2011 (7 pages).
Office Action for Korean Patent Application No. 10-2010-7005419 dated May 16, 2012, with English translation thereof (6 pages).
Patent Abstract for Korean Publication No. 2007-0037805 published Apr. 9, 2007 (1 page).
Office Action for Chinese Patent Application No. 200880106130.6 dated Aug. 22, 2012, with English translation thereof (24 pages).
Office Action for Russian Application No. 2010112490/07 dated Aug. 28, 2012, with English translation thereof (6 pages).
Extended European Search Report for Application No. 11191878.5 dated Feb. 7, 2012 (8 pages).

* cited by examiner

FIG. 3
| INCOMING CALL TYPE | PROVIDING RADIO ACCESS TECHNOLOGY | |
| --- | --- | --- |
| | UMTS | LTE |
| VOICE COMMUNICATIONS | PROVIDED | NOT PROVIDED |
| TV TELEPHONE | PROVIDED | NOT PROVIDED |
| DATA COMMUNICATIONS | PROVIDED | PROVIDED |
| LOCATION INFORMATION | PROVIDED | NOT PROVIDED |
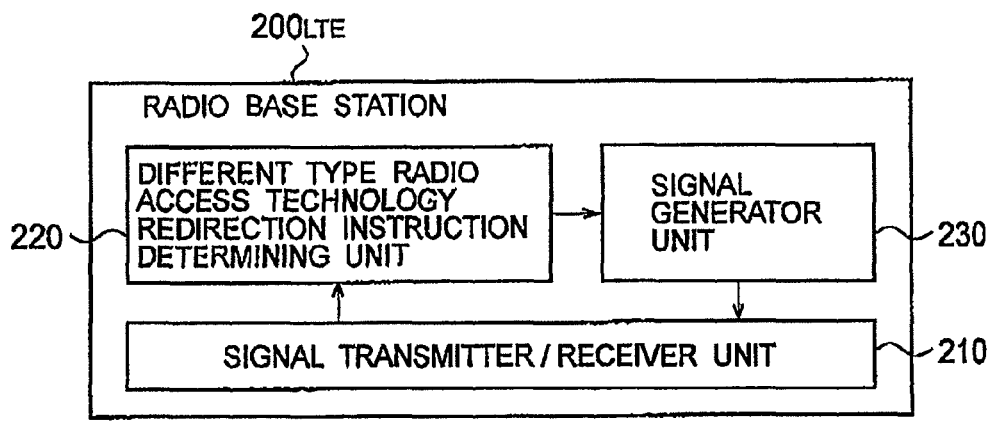
FIG. 4
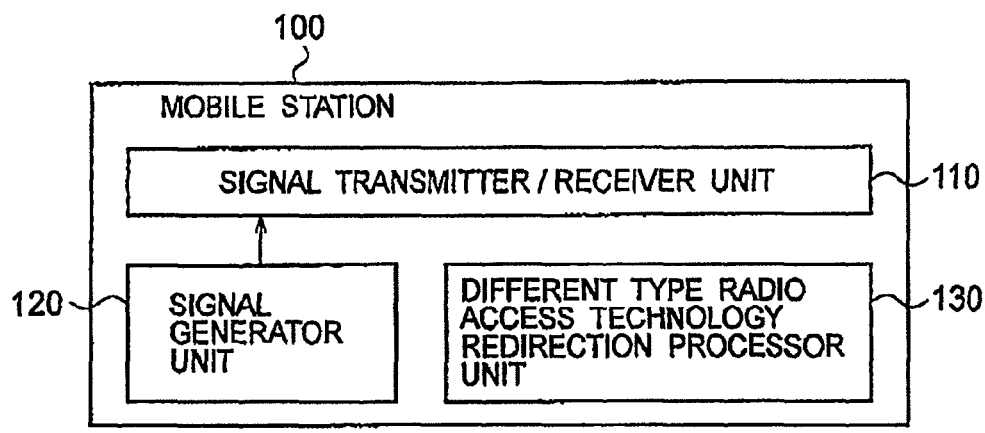
FIG. 5

CONNECTION SWITCHING BETWEEN A PLURALITY OF ACCESS TECHNOLOGIES

CROSS-REFERENCE TO RELATED APPLICATIONS

This application is a Divisional Application of the U.S. patent application Ser. No. 12/676,813, filed on Mar. 5, 2010, which claims priority to PCT International Application No. PCT/JP2008/066098, filed on Sep. 5, 2008, which claims priority to Japanese Patent Application No. 2007-233450, filed on Sep. 7, 2007; Japanese Patent Application No. 2008-021872, filed on Jan. 31, 2008; and Japanese Patent Application No. 2008-024617, filed on Feb. 4, 2008. The contents of these prior applications are incorporated herein by reference in their entirety.

BACKGROUND OF INVENTION

1. Technical Field

The present invention relates to a mobile communication method, a mobile exchange station, a radio base station and a mobile station.

2. Background Art

Conventional mobile communication systems provide voice communications, TV telephone communications and the like with stringent delay requirements by using circuit switching (CS) while providing data communications and the like with loose delay requirements by using packet switching (PS).

Meanwhile, when a new radio access technology (RAT) is introduced to a mobile communication system, the stability of the mobile communication system is given the top priority, and it is therefore general to use the new RAT to provide not various types of communication service but only limited types of communication service at an early stage of the introduction.

For example, assume that the LTE (Long Term Evolution) system is introduced as a new RAT to an area in which communication service is provided by using the UMTS (Universal Mobile Terrestrial System) as a RAT, the LTE system enabling communications which are more efficient and faster than those by the UMTS. In this case, considering that the LTE system is a mobile communication system using PS only, a conceivable introduction scenario is to provide communication service restricted to data communications at the early stage of the introduction, and to provide communication service, such as voice communications, with stringent delay requirements after the operation of the mobile communication system is stabilized (see Non-patent Document 1).

Next, referring to FIG. 12, an example of a method of providing communication service at an early stage of the introduction of the LTE system is described.

Here, a mobile station in an idle mode in the UMTS needs to perform the procedure shown in FIG. 12 in the UMTS, switch to the LTE system, and then start data communications in the LTE system, for example.

This is because the LTE system can provide more efficient and faster communications than the UMTS can. A concrete example of the method of providing communication service is described below with reference to FIG. 12.

As shown in FIG. 12, in Step 1, the mobile station transmits a "RRC Connection Request" for requesting a setup of a RRC connection, to a radio controller apparatus.

In Step 2, the radio controller apparatus transmits a "Radio Link Setup Request" for requesting a setup of a radio link, to a radio base station.

In Step 3, the radio base station performs a setup of the radio link in accordance with the "Radio Link Setup Request", and then transmits a "Radio Link Setup Response" for reporting the completion of the setup of the radio link, to the radio controller apparatus.

In Step 4, the radio controller apparatus transmits a "RRC Connection Setup" for performing a setup of the RRC connection, to the mobile station.

In Step 5, the mobile station performs a setup of the RRC connection in accordance with the "RRC Connection Setup", and then transmits a "RRC Connection Setup Complete" for reporting the completion of the setup of the RRC connection, to the radio controller apparatus.

In Step 6, the mobile station transmits a "Service Request" to a mobile exchange station through the radio controller apparatus.

In Step 7, the radio controller apparatus transmits the "Service Request" received from the mobile station, to the mobile exchange station.

In Step 8, the mobile exchange station transmits a "Security Mode Command" to the radio controller apparatus, so as to perform a security-related setup.

In Step 9, the radio controller apparatus transmits the "Security Mode Command" to the mobile station, so as to perform the security-related setup.

In Step 10, the mobile station transmits a "Security Mode Complete" for notifying a setup of a security-related parameter and the completion of the setup, to the radio controller apparatus.

In Step 11, the radio controller apparatus transmits the "Security Mode Complete" for notifying the completion of the setup of the security-related parameter, to the mobile exchange station.

In Step 12, the mobile station transmits an "Active PDP Context Request" for requesting a setup of a PDP context, to the mobile exchange station through the radio controller apparatus.

In Step 13, the radio controller apparatus transmits the "Active PDP Context Request" received from the mobile station, to the mobile exchange station.

In Step 14, the mobile exchange station transmits a "RAB Assignment Request" for requesting a setup of a radio access bearer (RAB), to the radio controller apparatus.

In Step 15, the radio controller apparatus determines whether or not to perform Inter-RAT handover to the LTE system, on the basis of information on the RAB whose setup is requested by the received "RAB Assignment Request".

In Step 16, when determining to perform Inter-RAT handover to the LTE system, the radio controller apparatus transmits a "RAB Assignment Response" for reporting that the RAB whose setup is requested is not to be set up, to the mobile exchange station.

Moreover, when determining to perform Inter-RAT handover to the LTE system, in Step 17, the radio controller apparatus transmits a "Relocation Required" for requesting Inter-RAT handover to the LTE system, to the mobile exchange station.

In Step 18, the mobile exchange station transmits a "Relocation Command" for instructing Inter-RAT handover to the LTE system, to the radio controller apparatus.

In Step 19, the radio controller apparatus transmits a "Handover from UTRAN Command" for instruct to perform Inter-RAT handover to the LTE system, to the mobile station.

In Step 20, the mobile station changes the radio access technology of a target for connection to the LTE system, and then starts data communications in the LTE system.

By contrast, assume that a mobile station in an idle mode in the LTE system requests to start voice communications. In this case, since the LTE system does not provide any voice communication service bearer, the mobile station needs to be instructed to perform Inter-RAT handover to the UMTS at a stage for a setup of a voice service bearer in a procedure for a call setup in the LTE system, and to start voice communications in the UMTS.

Non-patent Document 1: 3GPP TR25.913 V7.3.0, "Technical specification group radio access network; Requirement for Evolved UTRA (E-UTRA) Release 7.5"

However, the above-described conventional mobile communication system has the following problems.

Specifically, in the conventional mobile communication system, if a RAT in which the mobile station is in an idle mode does not provide communication service requested by the mobile station, or if there is a different RAT capable of providing the communication service more efficiently than the RAT being used provides, the mobile station is instructed to perform handover to the different RAT in a quite late stage in a connection setup procedure (after reaching Step 18 in the example of FIG. 12). This increases processing load on each access node of the RATs, and increases connection delay occurring between a calling operation by a user and completion of establishing a User-plane (U-plane).

SUMMARY OF INVENTION

The present invention is aimed to provide a mobile communication method, a mobile exchange station, a radio base station and a mobile station which are capable of reducing processing load on each access node and reducing a connection time to establish a U-plane after a calling operation by a user, by instructing the mobile station to perform handover to a different RAT at an early stage in a connection setup procedure, when communication service requested by the mobile station is not provided in a RAT currently used by the mobile station in an idle mode, or when the different RAT capable of providing the communication service more efficiently than the currently-used RAT provides exists.

A first aspect of the present invention is summarized as a mobile communication method in a mobile communication system including a plurality of radio access technologies, the mobile communication method including the steps of: notifying, from a mobile station to an access node in a first radio access technology of a target for connection, a desired call type for communication and a radio access capability of the mobile station; determining, at the access node in the first radio access technology, whether or not a radio access technology of a target for connection of the mobile station is to be switched from the first radio access technology to a second radio access technology, on the basis of the notified desired call type for communication and the notified radio access capability of the mobile station; making, at the access node in the first radio access technology, an instruction to the mobile station, when determining that the radio access technology of a target for connection of the mobile station is to be switched from the first radio access technology to the second radio access technology, the instruction instructing the switching; and transmitting, from the mobile station to an access node in the second radio access technology, a connection request signal, in accordance with the instruction from the access node in the first radio access technology.

To be more specific, a first aspect of the present invention is summarized as a mobile communication method in a mobile communication system including a plurality of radio access technologies, the mobile communication method including the steps of: notifying, from a mobile station to an access node in a first radio access technology of a target for connection, a desired call type for communication and a radio access capability of the mobile station; determining, at the access node in the first radio access technology, that a radio access technology of a target for connection of the mobile station is to be switched from the first radio access technology to a second radio access technology supporting the notified desired call type for communication, and instructing the switching to the mobile station; and transmitting, from the mobile station to an access node in the second radio access technology, a connection request signal, in accordance with the instruction from the access node in the first radio access technology.

A second aspect of the present invention is summarized as a mobile communication method in a mobile communication system including a plurality of radio access technologies, the mobile communication method including the steps of: notifying, from a mobile station to an access node in a first radio access technology of a target for connection, a desired call type for communication; notifying, from a mobile exchange station in the first radio access technology to the access node in the first radio access technology, a radio access capability of the mobile station; determining, at the access node in the first radio access technology, whether or not a radio access technology of a target for connection of the mobile station is to be switched from the first radio access technology to a second radio access technology, on the basis of the desired call type for communication notified by the mobile station and the radio access capability of the mobile station notified by the mobile exchange station in the first radio access technology; making, at from the access node in the first radio access technology, an instruction to the mobile station, when determining that the radio access technology of a target for connection of the mobile station is to be switched from the first radio access technology to the second radio access technology, the instruction instructing the switching; and transmitting, from the mobile station to an access node in the second radio access technology, a connection request signal, in accordance with the instruction from the access node in the first radio access technology.

A third aspect of the present invention is summarized as a mobile exchange station in a first radio access technology, including: a radio access capability holder unit configured to hold a radio access capability of each mobile station; a radio access capability notifying unit configured to notify, to an access node in the first radio access technology, the radio access capability of a mobile station which has transmitted a connection request signal to the first radio access technology; and a report receiver unit configured to receive a report from the access node in the first radio access technology, when the access node in the first radio access technology instructs the mobile station to switch a radio access technology used for connection by the mobile station from the first radio access technology to a second radio access technology, the report indicating the instruction.

In the third aspect, the radio access capability notifying unit can be configured to notify, to the access node in the first radio access technology, the radio access capability of the mobile station, via an initial setup request signal transmitted as a response to an initial signal from the access node in the first radio access technology.

In the third aspect, the report receiver unit can be configured to receive the report via an initial setup response signal transmitted as a response to an initial setup request signal from the access node in the first radio access technology.

A fourth aspect of the present invention is summarized as a radio controller apparatus in a first radio access technology, including: a connection request signal receiver unit configured to receive a connection request signal including a desired call type for communication and a radio access capability of the mobile station, from a mobile station via a radio base station in the first radio access technology; a determining unit configured to determine whether or not a radio access technology of a target for connection of the mobile station is to be switched from the first radio access technology to a second radio access technology, on the basis of the desired call type for communication and the radio access capability of the mobile station included in the received connection request signal; and an instructing unit configured to make an instruction to the mobile station by a connection response signal, when it is determined that a radio access technology of a target for connection of the mobile station is to be switched from the first radio access technology to the second radio access technology, the instruction instructing the switching.

To be more specific, a fourth aspect of the present invention is summarized as a radio controller apparatus in a first radio access technology, including: a connection request signal receiver unit configured to receive a connection request signal including a desired call type for communication and a radio access capability of the mobile station, from a mobile station via a radio base station in the first radio access technology; and an instructing unit configured to determine that a radio access technology of a target for connection of the mobile station is to be switched from the first radio access technology to a second radio access technology supporting the desired call type for communication included in the received connection request signal, and to instruct the switching to the mobile station by a connection response signal.

In the fourth aspect, the instructing unit can be configured to select a radio access technology capable of most efficiently providing communication service for the desired call type for communication, among a plurality of radio access technologies, as the second radio access technology.

In the fourth aspect, the radio controller apparatus can be configured not to set up a connection with a mobile exchange station, when the instructing unit determines that the radio access technology of a target for connection of the mobile station is to be switched from the first radio access technology to the second radio access technology.

In the fourth aspect, the instructing unit can be configured to transmit information on the second radio access technology together with the instruction made to the mobile station.

A fifth aspect of the present invention is summarized as a radio base station in a first radio access technology, including: a connection request signal receiver unit configured to receive a connection request signal including a desired call type for communication, from a mobile station; an initial signal transmitter unit configured to transmit an initial signal to a mobile exchange station in the first radio access technology in response to the received connection request signal; a determining unit configured to determine whether or not a radio access technology of a target for connection of the mobile station is to be switched from the first radio access technology to a second radio access technology, on the basis of the desired call type for communication included in the connection request signal transmitted by the mobile station and a radio access capability of the mobile station included in an initial setup request signal transmitted by the mobile exchange station in the first radio access technology in response to the initial signal; and an instructing unit configured to make an instruction to the mobile station by a connection response signal, when it is determined that the radio access technology of a target for connection of the mobile station is to be switched from the first radio access technology to the second radio access technology, the instruction instructing the switching.

In the fifth aspect, the determining unit can be configured to select a radio access technology capable of most efficiently providing communication service for the desired call type for communication, among a plurality of radio access technologies, as the second radio access technology.

In the fifth aspect, the connection request signal receiver unit can be configured to further acquire a reception level in each of the radio access technologies, from the mobile station.

In the fourth aspect, the radio controller apparatus can be configured not to set up a connection with a mobile exchange station, when the determining unit determines that the radio access technology of a target for connection of the mobile station is to be switched from the first radio access technology to the second radio access technology.

In the fourth aspect, the radio controller apparatus can be configured to report, to a mobile exchange station in the first radio access technology, that it has instructed the mobile station to switch the radio access technology of a target for connection of the mobile station from the first radio access technology to the second radio access technology, via an initial setup response signal transmitted as a response to an initial setup request signal from the mobile exchange station.

In the fifth aspect, the instructing unit can be configured to transmit information on the second radio access technology together with the instruction made to the mobile station.

A sixth aspect of the present invention is summarized as a mobile station capable of establishing connection by using anyone of a plurality of radio access technologies, the mobile station including: a connection request signal transmitter unit configured to transmit a connection request signal including a desired call type for communication and a radio access capability of the mobile station, to an access node in a first radio access technology; and a connection response signal receiver unit configured to receive a connection response signal as a response to the connection request signal, from the access node in the first radio access technology, wherein the connection request signal transmitter unit is configured to transmit a connection request signal to an access node in a second radio access technology, when the connection response signal instructs the mobile station to switch a radio access technology of a target for connection of the mobile station, from the first radio access technology to the second radio access technology.

In the sixth aspect, the connection response signal receiver unit can be configured to further receive information on the second radio access technology.

In the sixth aspect, the connection request signal transmitter unit can be configured to further transmit a reception level in each of the radio access technologies.

A seventh aspect of the present invention is summarized as a mobile exchange station in a first radio access technology, including: a radio access capability holder unit configured to hold a radio access capability of each mobile station; a radio access technology selector unit configured to select a radio access technology of a target for connection of a specific mobile station, upon receipt of an incoming call to the specific mobile station, on the basis of a call type of the incoming call and the radio access capability of the specific mobile station; and an incoming signal transmitter unit configured to transmit an incoming signal including the selected radio access technology, to the specific mobile station.

A eighth aspect of the present invention is summarized as a mobile station capable of establishing connection by using any one of a plurality of radio access technologies, the mobile station including: a connection request signal transmitter unit configured to transmit a connection request signal to an access node in a radio access technology included in a received incoming signal.

A ninth aspect of the present invention is summarized as a mobile communication method in a mobile communication system including a plurality of radio access technologies, the mobile communication method including the steps of: notifying, from a mobile station to an access node in a first radio access technology of a target for connection, a desired call type for communication; notifying, from the access node in the first radio access technology to a mobile exchange station in the first radio access technology, the desired call type for communication; determining, at the mobile exchange station in the first radio access technology, whether or not a radio access technology of a target for connection of the mobile station is to be switched from the first radio access technology to a second radio access technology, on the basis of the notified desired call type for communication and a radio access capability of the mobile station managed by the mobile exchange station; making, at the mobile exchange station in the first radio access technology, an instruction to the access node in the first radio access technology, when determining that the radio access technology of a target for connection of the mobile station is to be switched from the first radio access technology to the second radio access technology, the instruction instructing the switching; and transmitting, from the mobile station to an access node in the second radio access technology, a connection request signal in accordance with the instruction from the access node in the first radio access technology.

To be more specific, a ninth aspect of the present invention is summarized as a mobile communication method in a mobile communication system including a plurality of radio access technologies, the mobile communication method including the steps of: notifying, from a mobile station to an access node in a first radio access technology of a target for connection, a desired call type for communication; notifying, from the access node in the first radio access technology to a mobile exchange station in the first radio access technology, the desired call type for communication; determining, at the mobile exchange station in the first radio access technology, that a radio access technology of a target for connection of the mobile station is to be switched from the first radio access technology to a second radio access technology supporting the notified desired call type for communication; instructing the switching to the access node in the first radio access technology; and transmitting, from the mobile station to an access node in the second radio access technology, a connection request signal in accordance with the instruction from the access node in the first radio access technology.

In the ninth aspect, the access node in the first radio access technology can notify, to the mobile exchange station in the first radio access technology, the desired call type for communication by an initial signal.

In the ninth aspect, the mobile exchange station in the first radio access technology can make the instruction that the radio access technology of a target for connection of the mobile station is to be switched from the first radio access technology to the second radio access technology, by an initial setup rejection signal.

A tenth aspect of the present invention is summarized as a mobile station capable of establishing connection by using any one of a plurality of radio access technologies, the mobile station including: a connection request signal transmitter unit configured to transmit a connection request signal including a desired call type for communication, to an access node in a first radio access technology; and a connection response signal receiver unit configured to receive a connection response signal as a response to the connection request signal, from the access node in the first radio access technology, wherein the connection request signal transmitter unit is configured to transmit a connection request signal to an access node in a second radio access technology, when the connection response signal instructs the mobile station to switch a radio access technology of a target for connection of the mobile station, from the first radio access technology to the second radio access technology.

A eleventh aspect of the present invention is summarized as a mobile station capable of establishing connection by using any one of a plurality of radio access technologies, the mobile station including: a connection request signal transmitter unit configured to transmit a connection request signal including a desired call type for communication, to an access node in a first radio access technology; a connection response signal receiver unit configured to receive a connection response signal as a response to the connection request signal, from the access node in the first radio access technology; a connection response completion signal transmitter unit configured to transmit a connection response completion signal including a radio access capability of the mobile station, to the access node in the first radio access technology, in response to the received connection response signal; and a switching instruction signal receiver unit configured to receive a switching instruction signal from the access node in the first radio access technology, wherein the connection request signal transmitter unit is configured to transmit a connection request signal to an access node in a second radio access technology, when the switching instruction signal instructs the mobile station to switch a radio access technology of a target for connection of the mobile station, from the first radio access technology to the second radio access technology.

A twelfth aspect of the present invention is summarized as a mobile station capable of establishing connection by using any one of a plurality of radio access technologies, the mobile station including: a connection request signal transmitter unit configured to transmit a connection request signal to an access node in a first radio access technology; a connection response signal receiver unit configured to receive a connection response signal as a response to the connection request signal, from the access node in the first radio access technology; and a connection response completion signal transmitter unit configured to transmit a connection response completion signal including a desired call type for communication and a radio access capability of the mobile station, to the access node in the first radio access technology, in response to the received connection response signal, wherein the connection request signal transmitter unit is configured to transmit a connection request signal to an access node in a second radio access technology, when a response to the connection response completion signal instructs the mobile station to switch a radio access technology of a target for connection of the mobile station, from the first radio access technology to the second radio access technology.

In the sixth aspect, the radio access capability of the mobile station can indicate whether or not the mobile station is capable of accessing an access node in at least one of a plurality of radio access technologies specified by broadcast information on a cell in which the mobile station is in an idle mode.

A thirteenth aspect of the present invention is summarized as a mobile station capable of establishing connection by using any one of a plurality of radio access technologies, the mobile station including: a connection request signal transmitter unit configured to, when the mobile station receives an incoming signal via a specific domain, identify a radio frequency at which the specific domain is provided, on the basis of broadcast information on a cell in which the mobile station is in an idle mode, and then transmit a connection request signal at the radio frequency.

A fourteenth aspect of the present invention is summarized as a mobile exchange station including: an incoming signal transmitter unit configured to transmit an incoming signal including a specific domain to a specific mobile station, when receiving an incoming call to the specific mobile station via the specific domain.

BRIEF DESCRIPTION OF THE DRAWINGS

FIG. 3 is a table showing an example of a table managed by a deferent type radio access capability holder unit of the mobile exchange station according to the first embodiment of the present invention.

FIG. 4 is a functional block diagram of a radio base station according to the first embodiment of the present invention.

FIG. 5 is a functional block diagram of a mobile station according to the first embodiment of the present invention.

DETAILED DESCRIPTION

Figure 1:
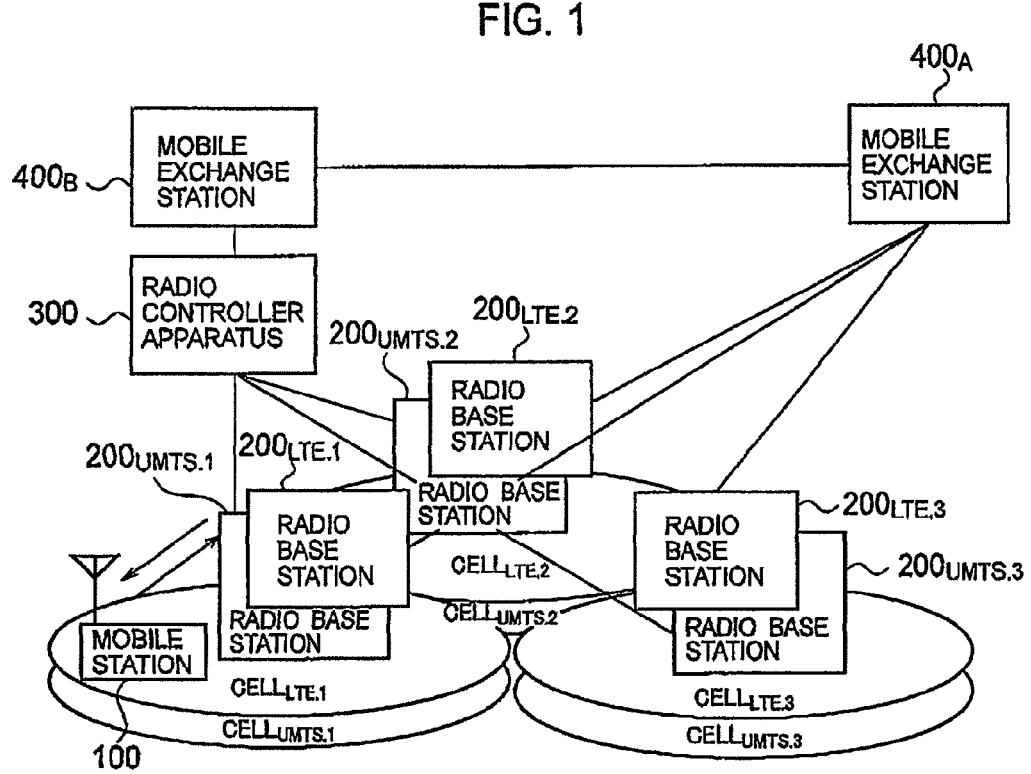
FIG. 1 is a configuration diagram of an entire mobile communication system according to a first embodiment of the present invention.

Configuration of Mobile Communication System according to First Embodiment of Present Invention A configuration of a mobile communication system according to a first embodiment of the present invention is described with reference to FIG. 1 to FIG. 5. Although description is given of an example of using the UMTS and the LTE system as radio access technologies in this embodiment, the present invention is applicable also to a mobile communication system providing radio access technologies other than the UMTS or the LTE system.

A configuration of the mobile communication system according to the first embodiment of the present invention is described below with reference to FIG. 1. It is to be noted that components having the same functions are denoted by the same reference numerals throughout the drawings for describing this embodiment, and repetition of descriptions of those components is omitted.

As shown in FIG. 1, the mobile communication system according to this embodiment includes: a mobile station 100 having a radio access capability to establish connection in multiple radio access technologies (the UMTS and the LTE system in this example); multiple radio base stations $200_{UMTS.1}$, $200_{UMTS.2}$ and $200_{UMTS.3}$ providing the UMTS as a radio access technology; a radio controller apparatus 300; a mobile exchange station 400B connected to the radio controller apparatus 300; multiple radio base stations $200_{LTE.1}$, $200_{LTE.2}$ and $200_{LTE.3}$ providing the LTE system as a radio access technology; and a mobile exchange station 400A connected to each of the radio base stations in the LTE system.

For example, when turned on, the mobile station 100 selects a cell (for example, a cell $CELL_{LTE.1}$) from cells in the UMTS and cells in the LTE system, and performs an Attach procedure with the mobile exchange station 400A through the radio base station $200_{LTE.1}$.

Assume that cells $CELL_{LTE.1}$, $CELL_{LTE.2}$ and $CELL_{LTE.3}$ in the LTE system belong to the same location registration area. In this case, an incoming signal to the mobile station 100 is transmitted to the mobile station 100 through all the radio base stations $200_{LTE.1}$, $200_{LTE.2}$ and $200_{LTE.3}$ in the location registration area.

Meanwhile, when cells $CELL_{UMTS.1}$, $CELL_{UMTS.2}$ and $CELL_{UMTS.3}$ in the UMTS are also included in the above location registration area, the incoming signal to the mobile station 100 is transmitted to the mobile station 100 through all the radio base stations $200_{LTE.1}$, $200_{LTE.2}$, $200_{LTE.3}$, $200_{UMTS.1}$, $200_{UMTS.2}$ and $200_{UMTS.3}$.

Figure 2:
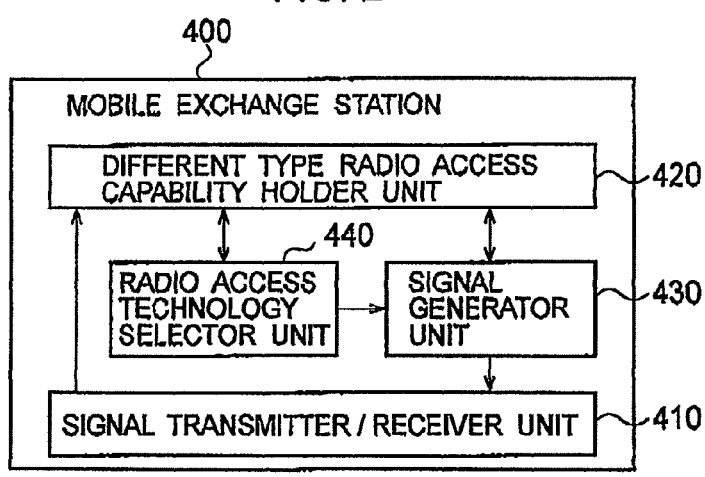
FIG. 2 is a functional block diagram of a mobile exchange station according to the first embodiment of the present invention.

As shown in FIG. 2, the mobile exchange station 400 according to this embodiment includes: a signal transmitter/receiver unit 410; a different type radio access capability holder unit 420 connected to the signal transmitter/receiver unit 410; a signal generator unit 430 connected to the different type radio access capability holder unit 420; and a radio access selector unit 440 connected to the signal generator unit 430 and the different type radio access capability holder unit 420.

The signal transmitter/receiver unit 410 is configured to perform: signal transmission/reception processing between the mobile station 100 and the mobile exchange station 400; signal transmission/reception processing between each radio base station $200_{LTE}$ and the mobile exchange station 400; and signal transmission/reception processing between the radio controller apparatus 300 and the mobile exchange station 400.

For example, when one of the radio base stations $200_{LTE}$ (access nodes) in the LTE system instructs the mobile station 100 to switch the radio access technology of a target for connection, from the LTE system to the UMTS, the signal transmitter/receiver unit 410 is configured to receive the report of the instruction, from the radio base station $200_{LTE}$ in the LTE system.

Here, the signal transmitter/receiver unit 410 may be configured to receive the report through an initial setup response signal.

The different type radio access capability holder unit 420 is configured to hold "radio access capability (capability to establish connection (access) in radio access technologies)" of each mobile station 100 received in one of or some of procedures among the Attach procedure, a location registration procedure or a connection procedure.

The signal generator unit 430 is configured to inquire the different type radio access capability holder unit 420 of the radio access capability of the mobile station 100, while performing the connection procedure with the mobile station 100, and to thereby acquire the radio access capability of the mobile station 100.

The signal generator unit 430 of the mobile exchange station 400 in the LTE system is configured to generate a predetermined signal for notifying the radio base stations $200_{LTE}$ of the acquired radio access capability of the mobile station 100.

For example, the predetermined signal may be an initial setup request signal (Initial Context Setup Request).

The signal generator unit 430 of the mobile exchange station 400 in the UMTS, by contrast, is configured to generate a predetermined signal for notifying the radio controller apparatus 300 of the radio access capability of the mobile station 100.

The radio access selector unit 440 is configured to select, upon receipt of an incoming call to the mobile station 100, a radio access technology of a target for connection of the mobile station 100, on the basis of the radio access capability of the mobile station 100, acquired by the inquiry to the different type radio access capability holder unit 420, and the type of the incoming call.

For example, the radio access selector unit 440 is configured to manage a correspondence table between "incoming call type" and "providing radio access technology". Here, the "providing radio access technology" shows whether or not each radio access technology provides communication service specified by a corresponding "incoming call type."

When the type of the incoming call to the mobile station 100 is "data communications" and the mobile station 100 has a radio access capability supporting both the "UMTS" and the "LTE system", the radio access selector unit 440 is configured to select the LTE system capable of efficient and fast communications, as the radio access technology of a target for connection of the mobile station 100.

When the type of the incoming call to the mobile station 100 is "voice communications", on the other hand, the radio access selector unit 440 is configured to select the UMTS as the radio access technology of a target for connection of the mobile station 100, since the "UMTS" is the only radio access technology providing voice communications.

The radio access technology selected by the radio access selector unit 440 is reported to the signal generator unit 430, the signal generator unit 430 generates an incoming signal including the received radio access technology, and then transmits the incoming signal to the signal transmitter/receiver unit 410. Then, the signal transmitter/receiver unit 410 transmits the incoming signal to the mobile station 100.

As shown in FIG. 4, each of the radio base stations $200_{LTE}$ in the LTE system according to this embodiment includes: a signal transmitter/receiver unit 210; a different type radio access technology redirection instruction determining unit 220 connected to the signal transmitter/receiver unit 210; and a signal generator unit 230 connected to the different type radio access technology redirection instruction determining unit 220 and the signal transmitter/receiver unit 210.

Although these functions are included in the radio controller apparatus 300 in the UMTS, a description of the radio controller apparatus 300 is omitted here.

The signal transmitter/receiver unit 210 is configured to perform signal transmission/reception processing between the radio base station $200_{LTE}$ and the mobile exchange station 400, and signal transmission/reception processing between the radio base station $200_{LTE}$ and the mobile station 100.

For example, the signal transmitter/receiver unit 210 receives a connection request signal (RRC Connection Request) from the mobile station 100, transmits an initial signal (Initial UE Message) to the mobile exchange station 400, receives an initial setup request signal (Initial Context Setup Request) from the mobile exchange station 400, and transmits an initial setup response signal (Initial Context Setup Response) to the mobile exchange station 400.

Specifically, the signal transmitter/receiver unit 210 may be configured to receive a connection request signal including a desired call type for communication and the radio access capability of the mobile station 100, from the mobile station 100.

In other words, the signal transmitter/receiver unit 210 may be configured to receive the desired call type for communication by the mobile station 100, through a connection request signal (RRC Connection Request).

Here, the signal transmitter/receiver unit 210 may be configured to receive a connection request signal including the desired call type for communication by the mobile station 100 but not including the radio access capability of the mobile station 100, and receive a connection response completion signal (RRC Connection Setup Comp) including the radio access capability of the mobile station 100, from the mobile station 100.

Alternatively, the signal transmitter/receiver 210 may be configured to receive a connection request signal including the desired call type for communication, from the mobile station 100, and receive an initial setup request signal including the radio access capability of the mobile station 100, from the mobile exchange station 400 in the LTE system.

In other words, the signal transmitter/receiver unit 210 may be configured to receive the desired call type of communication through the connection request signal while receiving the radio access capability of the mobile station 100 through the initial setup request signal from the mobile exchange station 400.

Further alternatively, the signal transmitter/receiver unit 210 may be configured to further acquire reception levels (for example, a received signal level, a received signal quality, a propagation loss and the like) in each radio access technology, from the mobile station 100 through the connection request signal or the like.

Additionally, the signal transmitter/receiver unit 210 is configured to transmit an initial signal to the mobile exchange station 400 in the LTE system, in response to the connection request signal received from the mobile station 100.

The different type radio access technology redirection instruction determining unit 220 is configured to determine whether or not to switch the radio access technology of a target for connection of the mobile station 100 from the LTE system to the UMTS (to perform handover to the UMTS), that is, whether or not to instruct the mobile station 100 to perform redirection to a different radio access technology, on the basis of the desired call type for communication by the mobile station 100 and the radio access capability of the mobile station 100.

In addition, when determining to switch the radio access technology of a target for connection of the mobile station 100 from the LTE system to the UMTS, the different type radio access technology redirection instruction determining unit 220 is configured to instruct the mobile station 100 to perform the switching, by a connection response signal (a "RRC Connection Reconfiguration", a "RRC Contention Resolution" or the like).

Here, the different type radio access technology redirection instruction determining unit 220 determines whether or not to switch or redirect to the UMTS for the mobile station 100, on the basis of the acquired desired call type for communication by the mobile station 100 and radio access capability of the mobile station 100, with reference to the correspondence table shown in FIG. 3.

For example, when the mobile station 100 has a radio access capability to support both the UMTS and the LTE system and transmits a connection request signal which is set with "voice communications" as a desired call type for communication to the radio base station $200_{LTE}$, the different type radio access technology redirection instruction determining unit 220 instructs the mobile station 100 to switch or redirect to the UMTS by a connection response signal, since the LTE system does not provide "voice communications".

To reduce delay in processing of handover to the UMTS, the different type radio access technology redirection instruction determining unit 220 may be configured to transmit information on the UMTS such as the frequency and the scrambling code used in the UMTS, and application possibility of transmission diversity, by a connection response signal or the like.

Moreover, when the desired call type for communication is "data communications" which can be provided by both of the radio access technologies (the UMTS and the LTE system), the different type radio access technology redirection instruction determining unit 220 may be configured to select a radio access technology in consideration of one or more of the following respects.

Radio access technology with best transmission efficiency
Radio access technology with shortest connection delay
Radio access technology capable of providing communication at maximum transmission rate
Radio access technology with best reception quality
Radio access technology with least load
Radio access technology with largest coverage area The signal generator unit 230 is configured to generate signals to be transmitted to the mobile station 100 and the mobile exchange station 400.

When the different type radio access technology redirection instruction determining unit 220 determines that switching or redirection to a different radio access technology (for example, the UMTS) is needed, the signal generator unit 230 generates a connection response signal including a radio access technology of a target for handover (redirection).

The connection response signal may be a "RRC Connection Setup", a "RRC Contention Resolution" or a "RRC Connection reconfiguration". Alternatively, the connection response signal may be a "RRC Connection Reject" for rejecting connection based on the connection request signal.

If the radio base station $200_{LTE}$ determines that switching or redirection to a different radio access technology is needed, after receiving an initial setup request signal from the mobile exchange station 400, the signal generator unit 230 generates an initial setup response signal including information indicating that the mobile station 100 is instructed to switch or redirect to a different radio access technology, and the signal transmitter/receiver unit 210 transmits the initial setup response signal to the mobile exchange station 400.

In other words, the radio base station $200_{LTE}$ is configured to report the mobile exchange station 400 in the LTE system that the mobile station 100 is instructed to switch the radio access technology of a target for connection, from the LTE system to the UMTS, through the initial setup response signal transmitted as a response to the initial setup request signal from the mobile exchange station 400.

Here, the initial setup response signal may be an "Initial UE ContextSetup response".

Moreover, when the different type radio access technology redirection instruction determining unit 220 determines that the radio access technology of a target for connection of the mobile station 100 is to be switched from the LTE system to the UMTS, the radio base station $200_{LTE}$ is configured not to set up connection with the mobile exchange station 400.

As shown in FIG. 5, the mobile station 100 according to this embodiment includes: a signal transmitter/receiver unit 110, a signal generator unit 120 connected to the signal transmitter/receiver unit 110; and a different type radio access technology redirection processor unit 130 connected to the signal transmitter/receiver unit 110.

The mobile station 100 according to this embodiment is capable of establishing connection in multiple radio access technologies (the UMTS and the LTE system in this embodiment).

The signal transmitter/receiver unit 110 is configured to perform signal transmission/reception processing between the mobile station 100 and each of the radio base stations $200_{LTE}$, and signal transmission/reception processing between the mobile station 100 and the mobile exchange station 400.

For example, the signal transmitter/receiver unit 110 may be configured to transmit a connection request signal including a desired call type for communication and the radio access capability of the mobile station 100, to the radio base station $200_{LTE}$ (access node) in the LTE system, that is, the radio access technology of a target for connection of the mobile station 100 (the radio access technology in which the mobile station 100 is currently in an idle mode).

Here, the signal transmitter/receiver unit 110 may be configured to transmit a connection request signal including the desired call type for communication by the mobile station 100 but not including the radio access capability of the mobile station 100, to the radio base station $200_{LTE}$ (access node) in the LTE system, that is, the radio access technology of a target for connection of the mobile station 100 (the radio access technology in which the mobile station 100 is currently in an idle mode).

Moreover, the signal transmitter/receiver unit 110 is configured to receive a connection response signal as a response to the connection request signal, from the radio base station $200_{LTE}$ (access node) in the LTE system.

Here, the signal transmitter/receiver unit 110 may be configured to transmit a connection request signal not including the desired call type for communication by the mobile station 100 or the radio access capability of the mobile station 100, and transmit a connection response completion signal including the desired call type for communication by the mobile station 100 and the radio access capability of the mobile station 100, to the radio base station $200_{LTE}$ (access node) in the LTE system which is the radio access technology of a target for connection of the mobile station 100 (the radio access technology in which the mobile station 100 is currently in an idle mode).

Note that, when the different type radio access technology redirection processor unit 130 determines that a switching of the radio access technology of a target for connection of the mobile station 100 from the LTE system to the UMTS is instructed by the connection response signal, the signal transmitter/receiver unit 110 is configured to transmit a connection request signal to the radio base station $200_{UMTS}$ (access node) in the UMTS.

In addition, the signal transmitter/receiver unit 110 may be configured to further receive information on the UMTS through a connection response signal or the like.

Additionally, the signal transmitter/receiver unit 110 may be configured to further transmit reception levels in each radio access technology.

Moreover, the signal transmitter/receiver unit 110 is configured to transmit a connection request signal for the radio access technology included in the received incoming signal.

The signal generator unit 120 is configured to generate a signal to be transmitted to the radio base station $200_{LTE}$ and the mobile exchange station 400.

When the mobile station 100 requests to start desired communication service, the signal generator unit 110 is configured to generate a connection request signal or a connection response completion signal including the desired call type for communication.

The connection request signal may be a "RRC Connection Request". Moreover, the connection response completion signal may be a "RRC Connection Setup Comp".

Further, the connection request signal or the connection response completion signal may include the radio access capability of the mobile station 100.

When the signal transmitter/receiver unit 110 receives the connection response signal, the different type radio access technology redirection processor unit 130 detects/selects a cell in the radio access technology to which the mobile station 100 is instructed by the connection response signal to switch or redirect, and then performs a connection procedure in the selected cell in the radio access technology.

By contrast, when the signal transmitter/receiver unit 110 receives an incoming signal to the mobile station 100 and the radio access technology in which a connection procedure is to be performed is different from that in which the mobile station 100 is in an idle mode, the different type radio access technology redirection processor unit 130 detects/selects a cell in the specified radio access technology, and then performs a connection procedure in the selected cell in the radio access technology.

(Operation in Mobile Communication Method According to First Embodiment of Present Invention)

Figure 6:
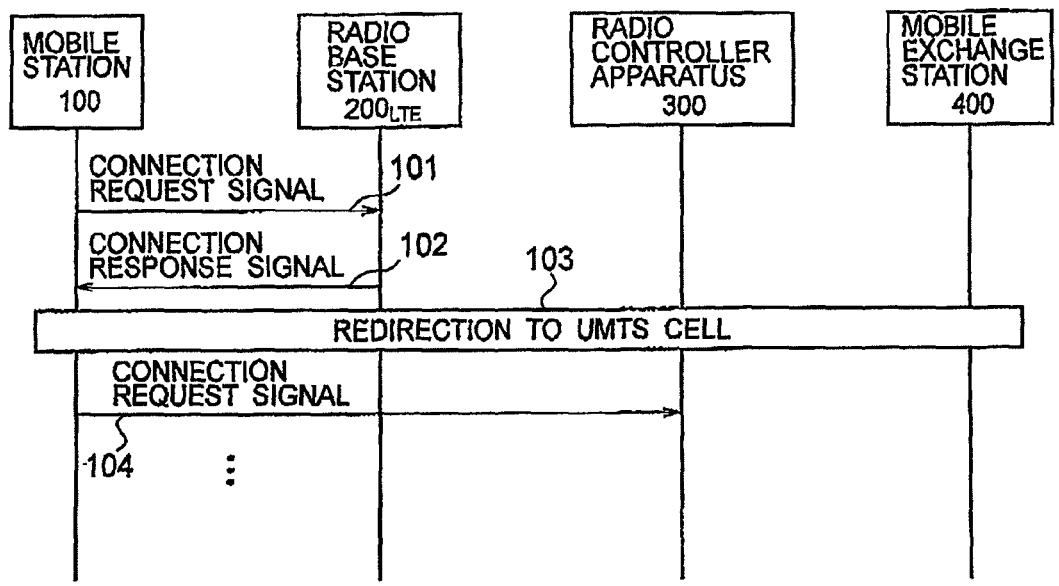
FIG. 6 is a sequence diagram showing operation of a mobile communication system according to the first embodiment of the present invention.
Figure 7:
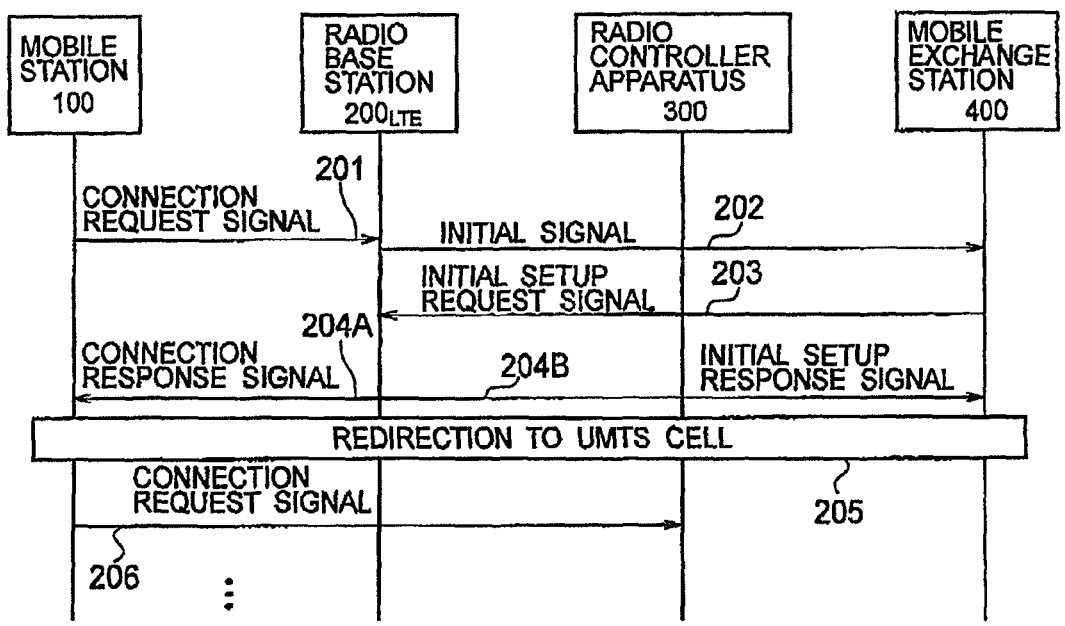
FIG. 7 is a sequence diagram showing operation of the mobile communication system according to the first embodiment of the present invention.

With reference to FIG. 6 and FIG. 7, operation in a mobile communication method according to the first embodiment of the present invention is described.

FIG. 6 shows an example of a case in which the mobile station 100 in an idle mode in the LTE system transmits a connection request signal including the radio access capability of the mobile station 100 and a desired call type for communication, to the radio base station $200_{LTE}$.

As shown in FIG. 6, in Step 101, the mobile station transmits a connection request signal (RRC Connection Request) including the radio access capability of the mobile station 100 and the desired call type for communication, to the radio base station $200_{LTE}$.

In Step 102, upon receipt of the connection request signal, the radio base station $200_{LTE}$ determines whether or not to redirect the radio access technology of a target for connection of the mobile station 100, from the LTE system to the UMTS, on the basis of the radio access capability of the mobile station 100 and the desired call type for communication.

Then, when determining to perform redirection (handover) of the radio access technology of the mobile station 100 to the different radio access technology (the UMTS, concretely), the radio base station $200_{LTE}$ instructs the mobile station 100 to perform the handover, by a connection response signal.

Here, the connection response signal may be a "RRC Connection Reconfiguration", a "RRC Connection Resolution" or a "RRC Connection Setup". In addition, the connection response signal may be a "RRC Connection Reject" for rejecting connection based on the connection request signal.

In Step 103, upon instruction of the redirection to the different radio access technology (UMTS), the mobile station 100 detects and selects a cell in the specified different radio access technology (UMTS).

In Step 104, the mobile station 100 performs a connection procedure in the cell in the different radio access technology (UMTS) thus selected, that is, transmits a connection request signal to the access node (radio controller apparatus 300) in the different radio access technology (UMTS) thus selected.

Here, the mobile station 100 may notify, to the radio base station $200_{LTE}$, the radio access capability of the mobile station 100 and the desired call type for communication by a connection response completion signal as a response to the connection response signal, instead of notifying, to the radio base station $200_{LTE}$, the radio access capability of the mobile station 100 and the desired call type for communication by the connection request signal.

Next, FIG. 7 shows an example of a case in which the mobile station 100 in an idle mode in the LTE system transmits a connection request signal including a desired call type for communication, to the radio base station $200_{LTE}$, and the mobile exchange station 400 notifies the radio base station $200_{LTE}$ of the radio access capability of the mobile station 100.

As shown in FIG. 7, in Step 201, the mobile station 100 transmits a connection request signal (RRC Connection Request) including a desired call type for communication, to the radio base station $200_{LTE}$.

In Step 202, upon receipt of the connection request signal, the radio base station $200_{LTE}$ transmits an initial signal to the mobile exchange station 400. Here, the initial signal may be an "Initial UE Message".

In Step 203, upon receipt of the initial signal, the mobile exchange station 400 transmits an initial setup request signal including the radio access capability of the mobile station 100, to the radio base station $200_{LTE}$. Here, the initial setup request signal may be an "Initial Context Setup Request".

In Step 204A, upon receipt of the initial setup request signal, the radio base station $200_{LTE}$ determines whether or not to redirect the radio access technology of the mobile station 100 to a different radio access technology (UMTS), on the basis of the desired call type for communication included in the received connection request signal and the radio access capability of the mobile station 100 included in the received initial setup request signal.

Then, when determining to switch or redirect the radio access technology of the mobile station 100 to the different radio access technology (the UMTS, concretely), the radio base station $200_{LTE}$ instructs the mobile station 100 to perform the switching or redirection, by a connection response signal.

Here, the connection request signal may be a "RRC Connection Reconfiguration" or a "RRC Connection Setup".

The radio base station $200_{LTE}$ may be configured to notify the mobile exchange station 400 of the determination result by an initial setup response signal in Step 204B. Here, the initial setup response signal may be an "Initial Context Setup Response".

In Step 205, upon instruction of the redirection to the different radio access technology (UMTS), the mobile station 100 detects and selects a cell in the specified different radio access technology (UMTS).

In Step 206, the mobile station 100 performs a connection procedure in the cell in the different radio access technology (UMTS) thus selected, that is, transmits a connection request signal to the access node (radio controller apparatus 300) in the different radio access technology (UMTS) thus selected.

Here, the mobile station 100 may notify, to the radio base station 200$_{LTE}$, the desired call type for communication by a connection response completion signal as a response to the connection response signal, instead of notifying, to the radio base station 200$_{LTE}$, the desired call type for communication by the connection request signal.

(Operations and Effects of Mobile Communication System According to First Embodiment of Present Invention)

By using the mobile communication system according to this embodiment, on the basis of a desired call type for communication by the mobile station 100 and the radio access capability of the mobile station 100, the radio base station 200$_{LTE}$ can determine in an early stage whether or not the desired call type for communication is provided by the radio access technology in which the mobile station 100 is currently in an idle mode, and can thereby instruct the mobile station 100 to perform redirection of the radio access technology to a different radio access technology, by a connection response signal when necessary. Accordingly, processing load on each access node of the radio access technologies can be reduced, and a connection time to establish a U-plane can be reduced.

Modification 1

A mobile communication system according to a modification 1 of the present invention is described below with reference to FIG. 8 and FIG. 9.

In the modification 1, a configuration is made to switch the radio access technology of a target for connection of a mobile station 100 from the UMTS to the LTE system.

Figure 8:
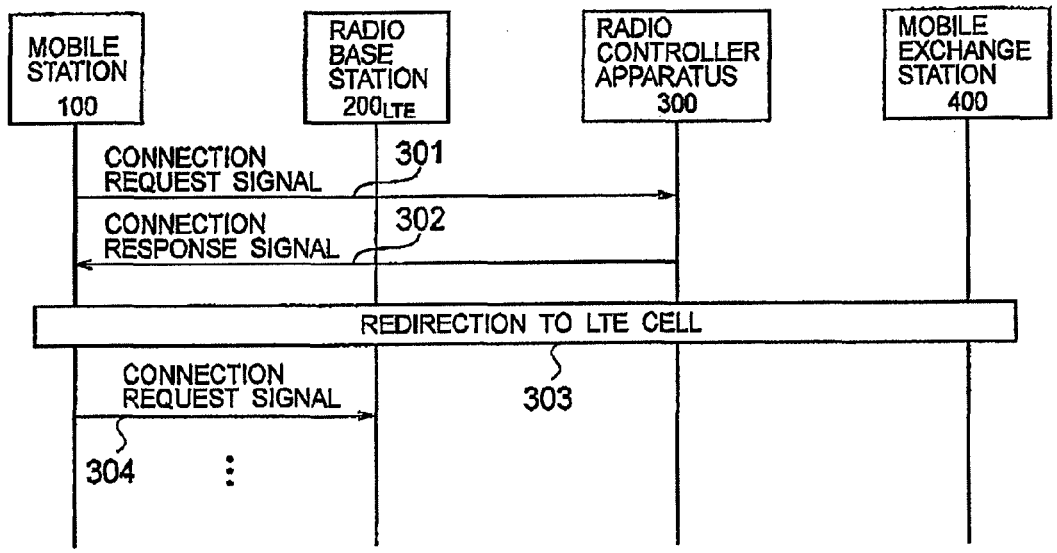
FIG. 8 is a sequence diagram showing operation of a mobile communication system according to a modification 1 of the present invention.

FIG. 8 shows an example of a case in which the mobile station 100 in an idle mode in the UMTS transmits a connection request signal including the radio access capability of the mobile station 100 and a desired call type for communication, to radio base station 200$_{UMTS}$.

As shown in FIG. 8, in Step 301, the mobile station 100 transmits a connection request signal (RRC Connection Request) including the radio access capability of the mobile station 100 and a desired call type for communication, to a radio controller apparatus 300.

In Step 302, upon receipt of the connection request signal, the radio controller apparatus 300 determines whether or not to redirect the radio access technology of a target for connection of the mobile station 100, from the UMTS to the LTE system, on the basis of the radio access capability of the mobile station 100 and the desired call type for communication.

Then, when determining to switch or redirect the radio access technology of the mobile station 100 to the different radio access technology (the LTE system, concretely), the radio controller apparatus 300 instructs the mobile station 100 to perform the switching or redirection, by a connection response signal.

Here, the connection response signal may be a "RRC Connection Reconfiguration" or a "RRC Connection Setup".

In Step 303, upon instruction of the redirection to the different radio access technology (LTE system), the mobile station 100 detects and selects a cell in the specified different radio access technology (LTE system).

In Step 304, the mobile station 100 performs a connection procedure in the cell in the different radio access technology (LTE system) thus selected, that is, transmits a connection request signal to the access node (radio base station 200$_{LTE}$) in the different radio access technology (LTE system) thus selected.

Here, the mobile station 100 may notify, to the radio controller apparatus 300, the radio access capability of the mobile station 100 and the desired call type for communication by a connection response completion signal as a response to the connection response signal, instead of notifying, to the radio controller apparatus 300, the radio access capability of the mobile station 100 and the desired call type for communication by the connection request signal.

Figure 9:
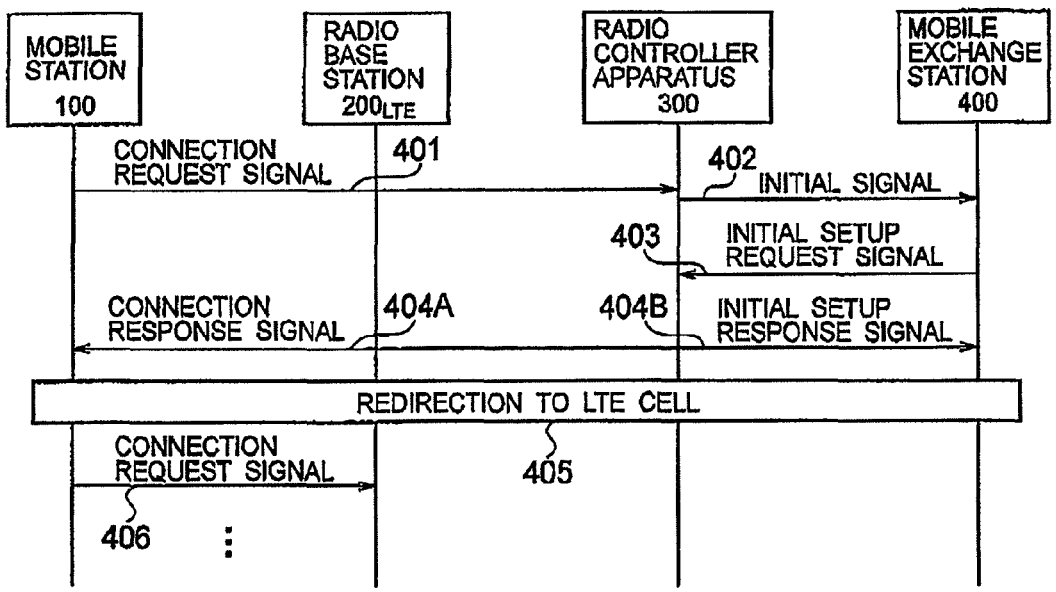
FIG. 9 is a sequence diagram showing operation of the mobile communication system according to the modification 1 of the present invention.

Next, FIG. 9 shows an example of a case in which the mobile station 100 in an idle mode in the UMTS transmits a connection request signal including a desired call type for communication, to the radio controller apparatus 300, and a mobile exchange station 400 notifies, to the radio controller apparatus 300, the radio access capability of the mobile station 100.

As shown in FIG. 9, in Step 401, the mobile station 100 transmits a connection request signal (RRC Connection Request) including a desired call type for communication, to the radio controller apparatus 300.

In Step 402, upon receipt of the connection request signal, the radio controller apparatus 300 transmits an initial signal to the mobile exchange station 400. Here, the initial signal may be an "Initial UE Message".

In Step 403, upon receipt of the initial signal, the mobile exchange station 400 transmits an initial setup request signal including the radio access capability of the mobile station 100, to the radio controller apparatus 300. Here, the initial setup request signal may be an "Initial Context Setup Request".

In Step 404A, upon receipt of the initial setup request signal, the radio controller apparatus 300 determines whether or not to redirect the radio access technology of the mobile station 100 to a different radio access technology (LTE), on the basis of the desired call type for communication included in the received connection request signal and the radio access capability of the mobile station 100 included in the received initial setup request signal.

Then, when determining to switch or redirect the radio access technology of the mobile station 100 to the different radio access technology (the LTE, concretely), the radio controller apparatus 300 instructs the mobile station 100 to perform the switching or redirection, by a connection response signal.

Here, the connection response signal may be a "RRC Connection Reconfiguration" or a "RRC Connection Setup".

The radio controller apparatus 300 may be configured to notify the mobile exchange station 400 of the determination result, in Step 404B.

In Step 405, upon instruction of the redirection to the different radio access technology (LTE), the mobile station 100 detects and selects a cell in the specified different radio access technology (LTE).

In Step 406, the mobile station 100 performs a connection procedure in the cell in the different radio access technology (LTE system) thus selected, that is, transmits a connection request signal to the access node (radio base station 200$_{LTE}$) in the different radio access technology (LTE system) thus selected.

Here, the mobile station 100 may notify, to the radio controller apparatus 300, the radio access capability of the mobile station 100 and the desired call type for communication, by a connection response completion signal as a response to the connection response signal, instead of notifying, to the radio controller apparatus 300, the desired call type for communication by the mobile station 100 by the connection request signal.

Modification 2

Figure 10:
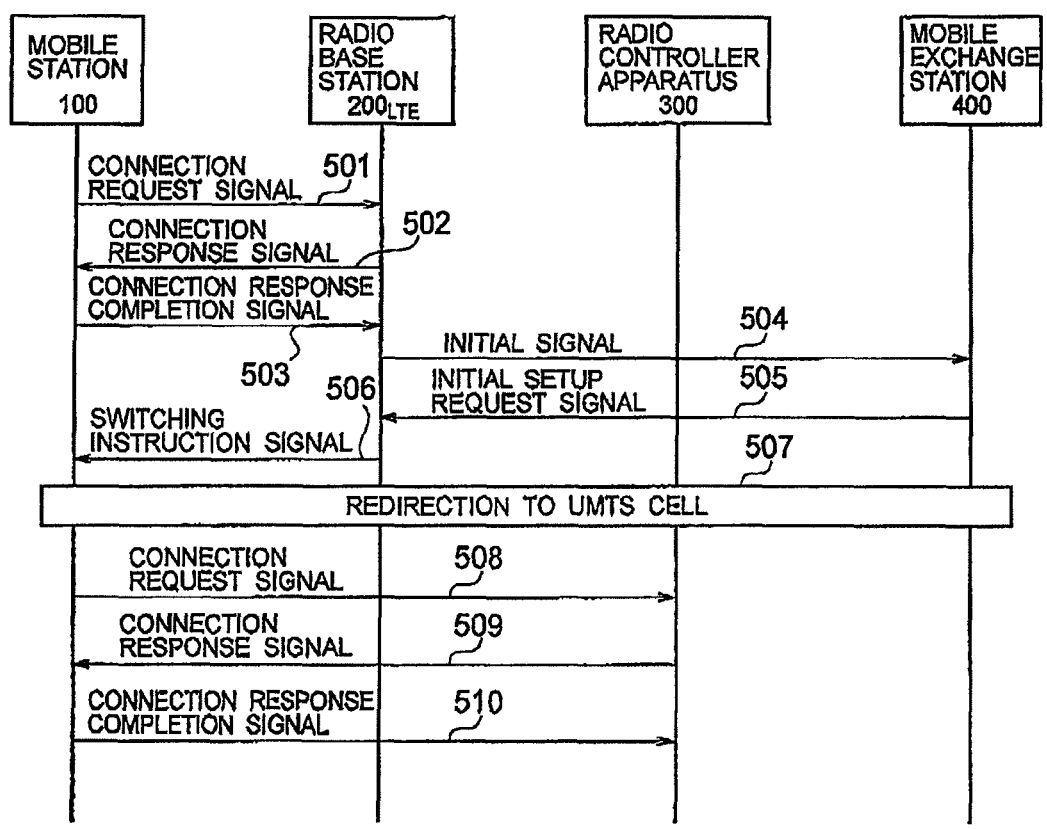
FIG. 10 is a sequence diagram showing operation of a mobile communication system according to a modification 2 of the present invention.
Figure 11:
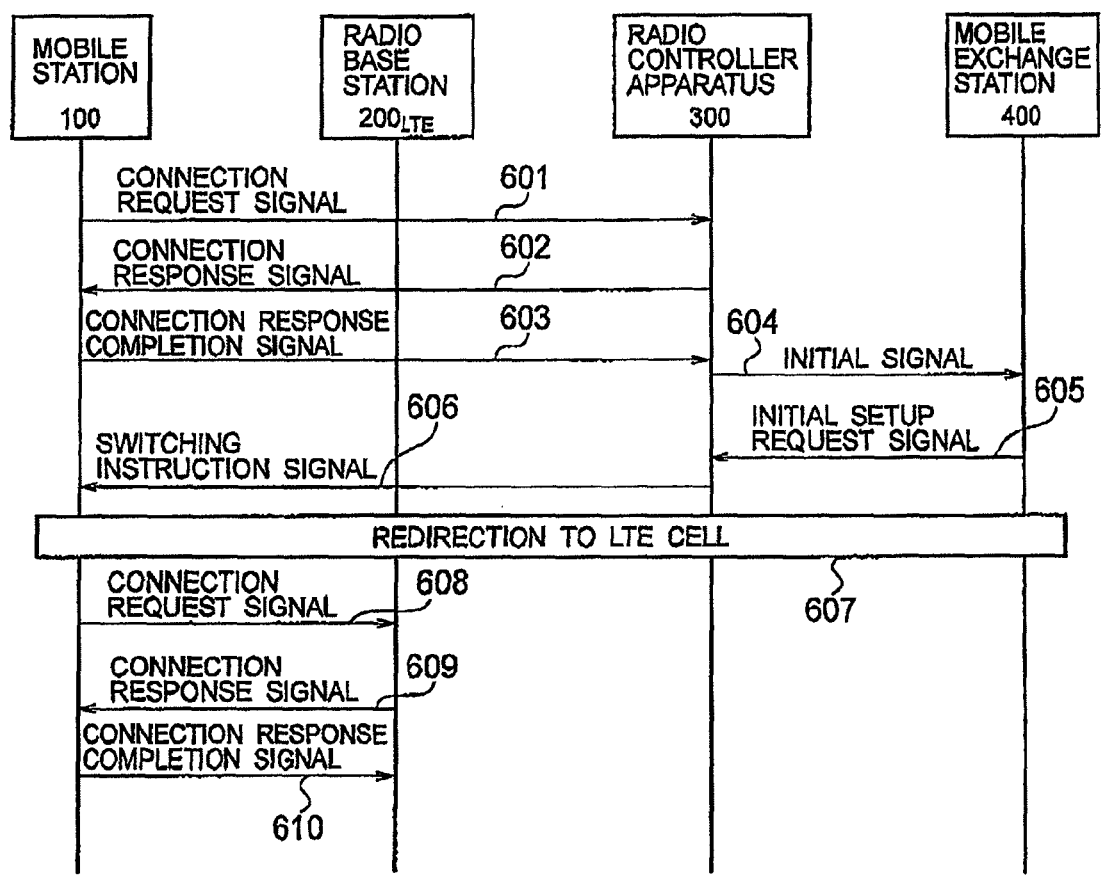
FIG. 11 is a sequence diagram showing operation of the mobile communication system according to the modification 2 of the present invention.
Figure 12:
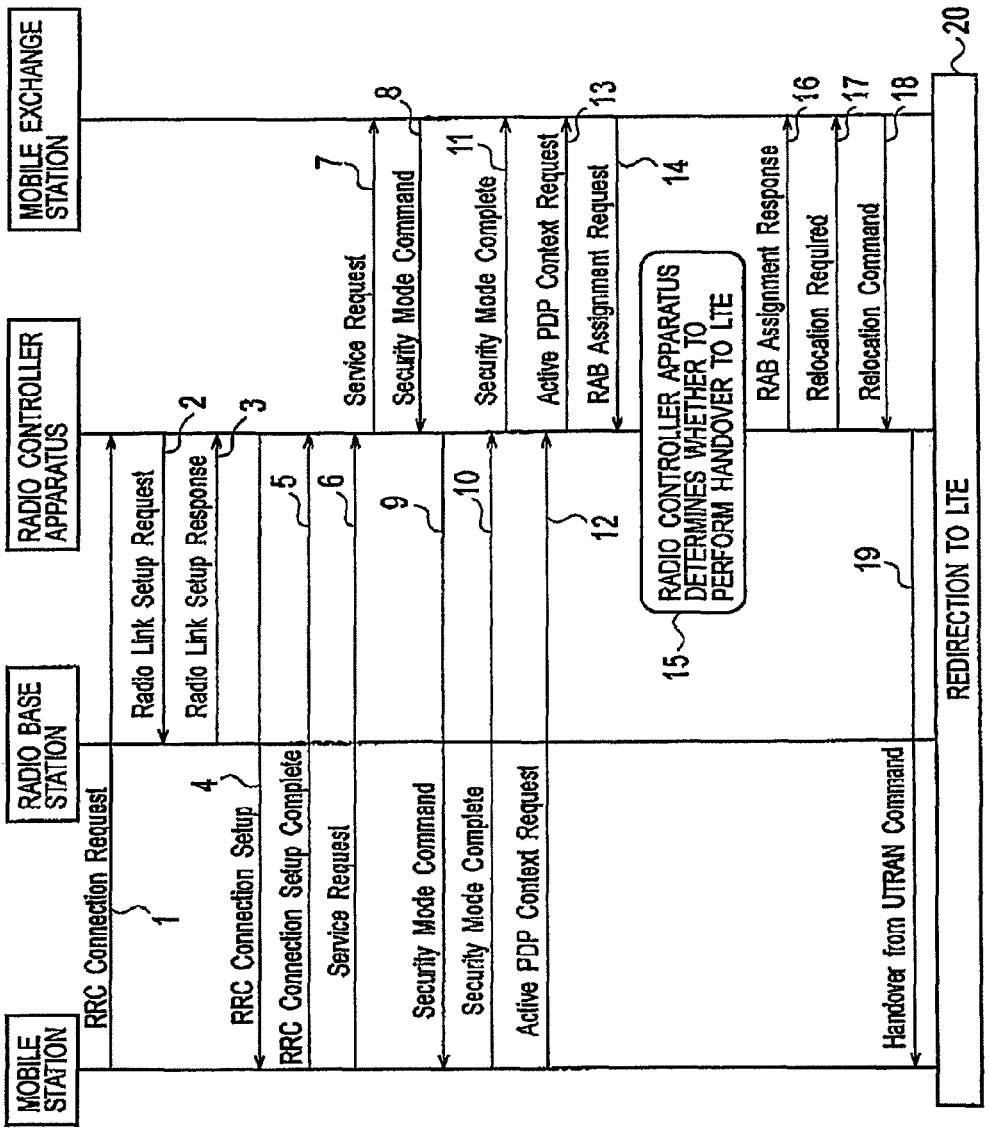
FIG. 12 is a sequence diagram showing an Inter-RAT handover procedure used in a conventional mobile communication system.

With reference to FIG. 10 and FIG. 11, a mobile communication system according to a modification 2 of the present invention is described below.

In this modification, the radio access selector unit 440 of the mobile exchange station 400 is configured to determine whether or not to switch the radio access technology of a target for connection of the mobile station 100 from a first radio access technology (the LTE system or the UMTS) to a second radio access technology (the UMTS or the LTE system), on the basis of a desired call type for communication notified by the mobile station 100 and the radio access capability of the mobile station 100 managed by the different type radio access capability holder unit 420.

Then, when it is determined to switch or redirect the radio access technology of the mobile station 100 to the different radio access technology, a signal transmitter/receiver unit 410 of the mobile exchange station 400 is configured to instruct the mobile station 100 and the radio base station $200_{LTE}$ to perform the switching or redirection.

FIG. 10 shows an example of a case in which the mobile station 100 in an idle mode in the LTE system performs redirection to a state for performing communications in the UMTS.

As shown in FIG. 10, in Step 501, the mobile station 100 in an idle mode in the LTE system transmits a connection request signal (RRC Connection Request) including a desired call type for communication by the mobile station 100, to the radio base station $200_{LTE}$.

In Step 502, the radio base station $200_{LTE}$ transmits a connection response signal to the mobile station 100 in response to the received connection request signal.

In Step 503, the mobile station 100 transmits a connection response completion signal including the radio access capability of the mobile station 100, to the radio base station $200_{LTE}$ in response to the received connection response signal.

Here, the mobile station 100 may transmit a connection request signal including the desired call type for communication by the mobile station 100 in Step 501, and transmit a connection response completion signal including the radio access capability of the mobile station 100 in Step 503.

Alternatively, the mobile station 100 may transmit a connection request signal including the desired call type for communication by the mobile station 100 in Step 501, and transmit a connection response completion signal not including the radio access capability of the mobile station 100 in Step 503.

Further alternatively, the mobile station 100 may transmit a connection request signal not including the desired call type for communication by the mobile station 100 and the radio access capability of the mobile station 100 in Step 501, and transmit a connection response completion signal including the desired call type for communication by the mobile station 100 and not including the radio access capability of the mobile station 100 in Step 503.

In Step 504, upon receipt of the connection response completion signal, the radio base station $200_{LTE}$ transmits an initial signal to the mobile exchange station 400.

Here, the initial signal may be an "Initial UE Message". In addition, the initial signal may include the desired call type for communication by the mobile station 100 and the radio access capability of the mobile station 100, or may include the desired call type for communication by the mobile station 100 and not include the radio access capability of the mobile station 100.

In Step 505, upon receipt of the initial signal, the mobile exchange station 400 determines whether or not to redirect the radio access technology of the mobile station 100 to a different radio access technology (UMTS), on the basis of the radio access capability of the mobile station 100 and the desired call type for communication which are included in the received connection request signal.

Here, in Step 505, the mobile exchange station 400, which has received the initial signal, may determine whether or not to redirect the radio access technology of the mobile station 100 to the different radio access technology (UMTS), on the basis of the desired call type for communication included in the received connection request signal and the radio access capability of the mobile station 100 managed by the mobile exchange station 400 itself.

For example, in Step 505, the mobile exchange station 400 may determine to switch the radio access technology of a target for connection of the mobile station 100, from the LTE system to the UMTS which supports the desired call type for communication included in the received connection request signal.

Alternatively, in Step 505, the mobile exchange station 400 may determine to switch the radio access technology of a target for connection of the mobile station 100, from the LTE system to a different radio access technology.

Then, when determining to switch or redirect the radio access technology of the mobile station 100 to the different radio access technology (the UMTS, concretely), the mobile exchange station 400 transmits an initial setup request signal or an initial setup rejection signal which indicates the switching or redirection (determination result), to the radio base station $200_{LTE}$.

Here, the initial setup request signal may be an "Initial Context Setup Request".

In Step 506, the radio base station $200_{LTE}$ instructs the mobile station 100 to switch the radio access technology of a target for connection of the mobile station 100, from the LTE system (first radio access technology) to the UMTS (second radio access technology), by a switching instruction signal.

Here, the switching instruction signal may be a "RRC Connection Release (connection release signal)".

Here, in Step 506, the radio base station $200_{LTE}$ may determine to switch the radio access technology of a target for connection of the mobile station 100 from the LTE system (first radio access technology) to the UMTS (second radio access technology), on the basis of the determination result included in the initial setup request signal, and then instructs the mobile station 100 to perform the switching by a switching instruction signal.

Alternatively, in Step 506, the radio base station $200_{LTE}$ may instruct the mobile station 100 about the determination result included in the initial setup request signal (that is, to switch the radio access technology of a target for connection of the mobile station 100 from the LTE system (first radio access technology) to the UMTS (second radio access technology)), by a switching instruction signal.

In Step 507, upon instruction of the redirection to the different radio access technology (UMTS), the mobile station 100 detects and selects a cell in the specified different radio access technology (UMTS).

In Steps 508 to 510, the mobile station 100 performs a connection procedure in the cell in the different radio access technology (UMTS) thus selected.

Specifically, in Step 508, the mobile station 100 transmits a connection request signal to the access node (radio controller apparatus 300) in the different radio access technology (UMTS) thus selected.

In Step 509, the radio controller apparatus 300 transmits a connection response signal to the mobile station 100, in response to the received connection request signal.

In Step 510, the mobile station 100 transmits a connection response completion signal to the radio controller apparatus 300, in response to the received connection response signal.

FIG. 11 shows an example of a case in which the mobile station 100 in an idle mode in the UMTS performs redirection to a state for performing communications in the LTE system.

As shown in FIG. 11, in Step 601, the mobile station 100 in an idle mode in the UMTS transmits a connection request signal (RRC Connection Request) including a desired call type for communication by the mobile station 100, to the radio controller apparatus 300.

In Step 602, the radio controller apparatus 300 transmits a connection response signal to the mobile station 100, in response to the received connection request signal.

In Step 603, the mobile station 100 transmits a connection response completion signal including the radio access capability of the mobile station 100, to the radio controller apparatus 300, in response to the received connection response signal.

In Step 603, upon receipt of the connection response completion signal, the radio controller apparatus 300 may determine whether or not to redirect the radio access technology of the mobile station 100 to a different radio access technology (LTE), on the basis of the radio access capability of the mobile station 100 included in the received connection response completion signal and the desired call type for communication by the mobile station 100 included in the connection request signal.

Here, the mobile station 100 may transmit a connection request signal including the desired call type for communication by the mobile station 100 in Step 601, and transmit a connection response completion signal including the radio access capability of the mobile station 100 in Step 603.

Alternatively, the mobile station 100 may transmit a connection request signal including the desired call type for communication by the mobile station 100 in Step 601, and transmit a connection response completion signal not including the radio access capability of the mobile station 100 in Step 603.

Further alternatively, the mobile station 100 may transmit a connection request signal not including the desired call type for communication by the mobile station 100 and the radio access capability of the mobile station 100 in Step 601, and transmit a connection response completion signal including the desired call type for communication by the mobile station 100 and not including the radio access capability of the mobile station 100 in Step 603.

In Step 604, upon receipt of the connection response completion signal, the radio controller apparatus 300 may transmit an initial signal to the mobile exchange station 400.

Here, the initial signal may be an "Initial UE Message". Moreover, the initial signal may include the desired call type for communication by the mobile station 100 and the radio access capability of the mobile station 100, or may include the desired call type for communication by the mobile station 100 and not include the radio access capability of the mobile station 100.

In Step 605, upon receipt of the initial signal, the mobile exchange station 400 may determine whether or not to redirect the radio access technology of the mobile station 100 to the different radio access technology (LTE), on the basis of the radio access capability of the mobile station 100 and the desired call type for communication which are included in the received connection request signal.

Here, in Step 605, the mobile exchange station 400, which has received the initial signal, may determine whether or not to redirect the radio access technology of the mobile station 100 to the different radio access technology (LTE system), on the basis of the desired call type for communication included in the received connection request signal and the radio access capability of the mobile station 100 managed by the mobile exchange station 400 itself.

Then, when determining to switch or redirect the radio access technology of the mobile station 100 to the different radio access technology (the LTE system, concretely), the mobile exchange station 400 transmits an initial setup request signal or an initial setup rejection signal, which indicates the switching or redirection, to the radio controller apparatus 300.

Here, the initial setup request signal may be an "Initial Context Setup Request".

In Step 606, the radio controller apparatus 300 instructs the mobile station 100 to switch the radio access technology of a target for connection of the mobile station 100, from the UMTS (first radio access technology) to the LTE system (second radio access technology), by a switching instruction signal.

Here, the switching instruction signal may be a "RRC Connection Release (connection release signal)".

Alternatively, if it is determined whether or not to redirect the radio access technology of the mobile station 100 to the different radio access technology (LTE) in Step 603, Step 603 may be followed by Step 606.

In Step 607, upon instruction of the redirect to the different radio access technology (LTE system), the mobile station 100 detects and selects a cell in the specified different radio access technology (LTE system).

In Steps 608 to 610, the mobile station 100 performs a connection procedure in the cell in the different radio access technology (LTE system) thus selected.

Specifically, in Step 608, the mobile station 100 transmits a connection request signal to the access node (radio base station $200_{LTE}$) in the different radio access technology (LTE system) thus selected.

In Step 609, the radio base station $200_{LTE}$ transmits a connection response signal to the mobile station 100, in response to the received connection response signal.

In Step 610, the mobile station 100 transmits a connection response completion signal to the radio base station $200_{LTE}$, in response to the received connection response signal.

Modification 3

In a modification 3 of the present invention, the signal transmitter/receiver unit 110 of the mobile station 100 is configured to make notification of the "radio access capability of the mobile station 100" indicating whether or not the mobile station 100 can access the access node of at least one of multiple radio access technologies specified by broadcast information on the cell in which the mobile station 100 is in an idle mode, by a connection request signal or a connection response completion signal.

Modification 4

In a modification 4 of the present invention, when the mobile station 100 receives an incoming signal via a specific domain (CS or PS), the signal transmitter/receiver unit 110 of the mobile station 100 is configured to check the radio frequency at which the specific domain is provided, on the basis of broadcast information on the cell in which the mobile station 100 is in an idle mode, and to then transmit a connection request signal at the radio frequency.

In addition, in this modification, upon receipt of an incoming call to a specific mobile station via a specific domain (CS or PS), a signal transmitter/receiver unit 410 of a mobile exchange station 400 is configured to transmit the incoming signal including the specific domain, to the specific mobile station.

Here, upon receipt of an incoming signal including a specific domain, the mobile station 100 may be configured to perform ordinary calling processing for accessing the specific domain in a cell in a radio access technology through which the incoming signal is received.

Modification 5

In a modification 5 of the present invention, the different type radio access technology redirection instruction determining unit 220 of the radio base station $200_{LTE}$ in the LTE system (first radio access technology) is configured to transmit one or multiple pieces of information shown below, as information on the UMTS (second radio access technology), to a mobile station 100.

Similarly, the different type radio access technology redirection instruction determining unit 220 of the radio controller apparatus 300 in the UMTS (first radio access technology) is configured to transmit one or multiple pieces of information shown below, as information on the LTE system (second radio access technology), to the mobile station 100.

Frequency band in second radio access technology
Frequency in second radio access technology
Channel setup information on common channel (Common Channel Configuration Information) in second radio access technology
Parameters for selection/reselection of cell in second radio access technology (Cell Selection/Reselection Parameters)
Information on peripheral cells in second radio access technology
Information on control of second radio access technology Thus, the signal transmitter/receiver unit 210 of the radio base station $200_{LTE}$ in the LTE system (first radio access technology) is configured to receive information on the UMTS (second radio access technology) from the radio controller apparatus 300 in the UMTS (second radio access technology).

By contrast, the signal transmitter/receiver unit 210 of the radio controller apparatus 300 in the UMTS (second radio access technology) is configured to transmit information on the UMTS (second radio access technology), to the radio base station $200_{LTE}$ in the LTE system (first radio access technology).

Additionally, the radio controller apparatus 300 in the UMTS (first radio access technology) is configured to receive information on the LTE system (second radio access technology), from the radio base station $200_{LTE}$ in the LTE system (second radio access technology).

By contrast, the signal transmitter/receiver unit 210 of the radio base station $200_{LTE}$ in the LTE system (second radio access technology) is configured to transmit information on the LTE system (second radio access technology), to the radio controller apparatus 300 in the UMTS (first radio access technology).

Moreover, upon receipt of information on the second radio access technology (the UMTS or the LTE system), the mobile station 100 can skip operation for acquiring information on the second radio access technology (the UMTS or the LTE system) from report information on a cell in the second radio access technology.

Here, the operations of the mobile station 100 and the radio base stations 200 may each be implemented by hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk or a CD-ROM.

The storage medium is connected to the processor so that the processor can read and write information from and into the storage medium. Moreover, the storage medium may be integrated into the processor. Additionally, the storage medium and the processor may be provided in an ASIC. The ASIC may be provided in a corresponding one of the mobile station 100 and the radio base station 200. Alternatively, the storage medium and the processor may be provided in a corresponding one of the mobile station 100 and the base station 200, as discrete components.

Hereinabove, the present invention is described in detail by using the above-described embodiment. However, it is apparent to those skilled in the art that the present invention is not to be limited to the embodiment described in this description. The present invention can be implemented as a modified or changed mode without departing from the spirit and scope of the present invention defined by the description in the scope of claims. Hence, what is described in this description is for illustrative purpose, and is not intended to impose any limitation on the present invention.

The entire content of Japanese Patent Application No. 2008-24617 (filed on Feb. 4, 2008) is incorporated in this description by reference.

As described above, the mobile communication method, the mobile exchange station, the radio base station and the mobile station according to the present invention are advantageous since they are capable of reducing processing load on each access node and reducing a connection time to establish a U-plane after a calling operation by a user, when communication service requested by the mobile station is not provided in a RAT currently used by the mobile station in an idle mode, or when a different RAT capable of providing the communication service more efficiently than the currently-used RAT provides exists, by instructing the mobile station to perform handover to the different RAT at an early stage in a connection setup procedure.

The invention claimed is:

1. A mobile communication method in a mobile communication system including a plurality of radio access technologies, the mobile communication method comprising the steps of:

notifying, from a mobile station to an access node in a first radio access technology, a desired call type for communication;

notifying, from a mobile exchange station in the first radio access technology to the access node in the first radio access technology, a radio access capability of the mobile station;

determining, at the access node in the first radio access technology, whether or not a radio access technology of the mobile station is to be changed from the first radio access technology to a second radio access technology, on the basis of the desired call type for the communication notified and the radio access capability of the mobile station;

making, at the access node in the first radio access technology, an instruction to the mobile station, when determining that the radio access technology of the mobile station is to be changed from the first radio access technology to the second radio access technology, the instruction instructing the change from the first radio access technology to the second radio access technology; and transmitting, from the mobile station to an access node in the second radio access technology, a connection request signal, in accordance with the instruction from the access node in the first radio access technology.

2. A mobile exchange station in a first radio access technology, comprising:

a radio access capability holder unit configured to hold a radio access capability of each mobile station;

a radio access capability notifying unit configured to notify, to an access node in the first radio access technology, the radio access capability of a mobile station which has transmitted a connection request signal including a desired call type for communication; and a report receiver unit configured to receive a report from the access node in the first radio access technology, the access node in the first radio access technology instructing the mobile station to change a radio access technology used for connection by the mobile station from the first radio access technology to a second radio access technology on the basis of the desired call type for the communication and the radio access capability of the mobile station, the report indicating the instruction.

3. The mobile exchange station according to claim 2, wherein the radio access capability notifying unit is configured to notify, to the access node in the first radio access technology, the radio access capability of the mobile station, via an initial setup request signal transmitted as a response to an initial signal from the access node in the first radio access technology.

4. The mobile exchange station according to claim 2, wherein the report receiver unit is configured to receive the report via an initial setup response signal transmitted as a response to an initial setup request signal from the access node in the first radio access technology.

5. A mobile communication method in a mobile communication system including a plurality of radio access technologies, the mobile communication method comprising the steps of:

transmitting, from a mobile station to an access node in a first radio access technology, a connection request signal including a desired call type for the communication;

notifying, from the access node in the first radio access technology to a mobile exchange station in the first radio access technology, the desired call type for the communication;

determining, at the mobile exchange station in the first radio access technology, whether or not a radio access technology of the mobile station is to be changed from the first radio access technology to a second radio access technology, on the basis of the desired call type for the communication notified and the radio access capability of the mobile station;

making, at the mobile exchange station in the first radio access technology, an instruction to the access node in the first radio access technology, when determining that the radio access technology of the mobile station is to be changed from the first radio access technology to the second radio access technology, the instruction instructing the change from the first radio access technology to the second radio access technology; and transmitting, from the mobile station to an access node in the second radio access technology, the connection request signal in accordance with the instruction from the access node in the first radio access technology.

6. The mobile communication method according to claim 5, wherein the access node in the first radio access technology notifies, to the mobile exchange station in the first radio access technology, the desired call type for communication by an initial signal.

7. A mobile station for establishing connection by using any one of a plurality of radio access technologies, the mobile station comprising:

a connection request signal transmitter unit configured to transmit a connection request signal including a desired call type for communication, to an access node in a first radio access technology; and a connection response signal receiver unit configured to receive an Radio Resource Control (RRC) Connection Reject-as a response to the connection request signal, from the access node in the first radio access technology, wherein the connection request signal transmitter unit is configured to transmit a second connection request signal to an access node in a second radio access technology, when the RRC Connection Reject instructs the mobile station to change a radio access technology of the mobile station, from the first radio access technology to the second radio access technology.

8. A mobile communication method in a mobile communication system including a plurality of radio access technologies, the mobile communication method comprising the steps of:

transmitting, from a mobile station to an access node in a first radio access technology, a connection request signal including a desired call type for communication;

transmitting, from the access node in the first radio access technology to the mobile station, a connection response signal as a response to the connection request signal;

transmitting, from the mobile station to the access node in the first radio access technology, a connection response complete signal including a radio access capability of the mobile station, in accordance with the received connection response signal;

notifying, from the access node in the first radio access technology to a mobile exchange station in the first radio access technology, the desired call type for communication and the radio access capability of the mobile station;

determining, at the mobile exchange station in the first radio access technology, whether or not a radio access technology of the mobile station is to be changed from the first radio access technology to a second radio access technology, on the basis of the desired call type for the communication notified and the radio access capability of the mobile station;

making, at the mobile exchange station in the first radio access technology, an instruction to the access node in the first radio access technology, when determining that the radio access technology of the mobile station is to be changed from the first radio access technology to the second radio access technology, the instruction instructing the change from the first radio access technology to the second radio access technology; and transmitting, from the mobile station to an access node in the second radio access technology, a connection request signal, in accordance with the instruction from the access node in the first radio access technology.

\* \* \* \* \*